US011313573B2

(12) United States Patent
Wang et al.

(10) Patent No.: US 11,313,573 B2
(45) Date of Patent: *Apr. 26, 2022

(54) LOAD MANAGEMENT SYSTEM AND METHOD UTILIZING OCCUPANCY DATA AND LEARNED DEVICE BEHAVIOR

(71) Applicant: EATON INTELLIGENT POWER LIMITED, Dublin (IE)

(72) Inventors: Yigang Wang, Maple Grove, MN (US); Chinmaya Patil, South Lyon, MI (US); Ronald L. Thompson, Knoxville, TN (US); Austin Eldridge, Knoxville, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 4 days.

This patent is subject to a terminal disclaimer.

(21) Appl. No.: 16/847,920

(22) Filed: Apr. 14, 2020

(65) Prior Publication Data

US 2020/0240660 A1 Jul. 30, 2020

Related U.S. Application Data

(63) Continuation of application No. 15/480,626, filed on Apr. 6, 2017, now Pat. No. 10,655,872.

(51) Int. Cl.
*F24F 11/30* (2018.01)
*H01H 9/16* (2006.01)
(Continued)

(52) U.S. Cl.
CPC .............. *F24F 11/30* (2018.01); *F24F 11/62* (2018.01); *G06Q 10/0631* (2013.01);
(Continued)

(58) Field of Classification Search
None
See application file for complete search history.

(56) References Cited

U.S. PATENT DOCUMENTS

| 5,373,411 A * | 12/1994 | Grass ..................... H01H 89/06 361/64 |
| 10,655,872 B2 * | 5/2020 | Wang ...................... F24F 11/62 |

(Continued)

OTHER PUBLICATIONS

IR. R. Maaijen et al., Human Centered Energy Control: Taking the Occupancy in the Control Loop of Building Systems, Rehva Journal, Rehva Annual Meeting, Aug. 2012, http://www.rehva.eu/en/rehva-european-hvac-Journal, pp. 34-36.

(Continued)

*Primary Examiner* — Bernard G Lindsay
(74) *Attorney, Agent, or Firm* — Eckert Seamans Cherin & Mellott, LLC

(57) ABSTRACT

A load management system including a number of sensors structured to sense characteristics of a managed area, a controller including a processor structured to estimate occupancy of the managed area based on outputs of the number of sensors and to implement a load management scheme, a number of circuit breakers, at least one of the number of circuit breakers being electrically connected to a corresponding load circuit and including a metering circuit structured to meter energy provided to the load circuit and a device control unit structured to control one or more load devices electrically connected to the load circuit based on the load management scheme. The processor is structured to (Continued)

implement the load management scheme based on outputs of the sensors and metering information of one or more of the circuit breakers.

19 Claims, 6 Drawing Sheets

(51) Int. Cl.
| | |
|---|---|
| *G06Q 10/06* | (2012.01) |
| *F24F 11/62* | (2018.01) |
| *G06Q 50/06* | (2012.01) |
| *H01H 9/54* | (2006.01) |
| *H01H 71/12* | (2006.01) |
| *H01H 83/20* | (2006.01) |
| *F24F 11/63* | (2018.01) |
| *F24F 130/00* | (2018.01) |
| *F24F 130/10* | (2018.01) |
| *F24F 11/46* | (2018.01) |
| *F24F 110/10* | (2018.01) |
| *F24F 11/52* | (2018.01) |

(52) U.S. Cl.
CPC ............. *G06Q 50/06* (2013.01); *H01H 9/167* (2013.01); *H01H 9/54* (2013.01); *H01H 71/12* (2013.01); *F24F 11/46* (2018.01); *F24F 11/52* (2018.01); *F24F 11/63* (2018.01); *F24F 2110/10* (2018.01); *F24F 2130/00* (2018.01); *F24F 2130/10* (2018.01); *H01H 9/168* (2013.01); *H01H 83/20* (2013.01)

(56) References Cited

U.S. PATENT DOCUMENTS

| | | | |
|---|---|---|---|
| 2002/0105770 A1* | 8/2002 | Seese | H01H 9/167 361/115 |
| 2005/0116814 A1* | 6/2005 | Rodgers | H04B 3/54 340/538 |
| 2006/0049694 A1 | 3/2006 | Kates | |
| 2006/0179329 A1 | 8/2006 | Terechko et al. | |
| 2010/0145536 A1 | 6/2010 | Masters et al. | |
| 2013/0274940 A1* | 10/2013 | Wei | G06Q 50/06 700/291 |
| 2014/0001977 A1 | 1/2014 | Zacharchuk et al. | |
| 2014/0088780 A1 | 3/2014 | Chen | |
| 2014/0211345 A1 | 7/2014 | Thompson et al. | |
| 2014/0214218 A1 | 7/2014 | Eldridge et al. | |
| 2014/0324244 A1* | 10/2014 | Musunuri | G06N 20/00 700/299 |
| 2015/0276253 A1 | 10/2015 | Montalvo | |
| 2016/0091904 A1 | 3/2016 | Horesh et al. | |
| 2016/0225562 A1 | 4/2016 | Franks et al. | |
| 2016/0358722 A1 | 12/2016 | Lakshmanan et al. | |

OTHER PUBLICATIONS

Jonathan Wooley et al., UC Berkeley California Institute for Energy and Environment, ACEEE Summer Study on Energy Efficiency in Buildings, Copyright 2014, pp. 3-337-3-350.

* cited by examiner

LOAD MANAGEMENT SYSTEM AND METHOD UTILIZING OCCUPANCY DATA AND LEARNED DEVICE BEHAVIOR

CROSS-REFERENCE TO RELATED APPLICATIONS

This application is a continuation of, and claims priority from, U.S. patent application Ser. No. 15/480,626, filed Apr. 6, 2017, entitled "LOAD MANAGEMENT SYSTEM AND METHOD OF IMPLEMENTING A LOAD MANAGEMENT SCHEME", the contents of which are incorporated herein by reference.

BACKGROUND

Field

The disclosed concept relates generally to load management systems and methods of implementing load management schemes. The disclosed concept also relates to circuit breakers.

Background Information

It is desirable to improve the energy efficiency of buildings. A building's heating, ventilation and air conditioning (HVAC) system is typically a large percentage of the energy expenditure for the building. Thus, improving the efficiency of the HVAC system can have a large effect on the energy efficiency of the building.

Some solutions to improve the efficiency of HVAC systems control the HVAC system based on whether a person is present in the building or in a certain part of the building. For example, the HVAC system can be controlled to turn off or reduce the heat in the building when a person is not present in the building. The HVAC system can then be controlled to turn on or increase the heat in the building when the person returns to the building. Similarly, the HVAC system can be controlled to turn off or reduce the heat in a certain area of the building when a person is not present in the area and then turn on or increase the heat in the area of the building when the person returns to the area of the building.

Some of the goals in improving the efficiency of an HVAC system are to provide an optimal efficiency improvement and to be cost effective. That is, a solution to improve the HVAC system should be able to pay for itself in energy savings in a reasonable amount of time. The aforementioned solutions for improving the efficiency of HVAC systems have difficulty in meeting these goals. The aforementioned solutions are instituted in the control system for the HVAC systems (e.g., a thermostat) and thus, can only estimate the energy savings provided by a certain control scheme. Furthermore, the aforementioned solutions are limited to HVAC systems and, thus, their improvements are limited to improving the efficiency of the HVAC system in a building, rather than improving the efficiency of all loads in a building.

There is thus room for improvement in load management systems. There is also room for improvement in methods of load management schemes. There is further room for improvement in circuit breakers.

SUMMARY

These needs and others are met by embodiments of the disclosed concept, which are directed to a load management system that implements a load management scheme using metering information. These needs and others are also me by embodiments of the disclosed concept which are directed to a method of implementing a load management scheme and a circuit breaker.

In accordance with aspects of the disclosed concept, a load management system comprises: a number of sensors structured to sense characteristics of a managed area; a controller including a processor structured to estimate occupancy of the managed area based on outputs of the number of sensors and to implement a load management scheme; a number of circuit breakers, at least one of the number of circuit breakers being electrically connected to a corresponding load circuit and including a metering circuit structured to meter energy provided to the load circuit and a device control unit structured to control one or more load devices electrically connected to the load circuit based on the load management scheme; and wherein the processor is structured to implement the load management scheme based on outputs of the sensors and metering information of one or more of the circuit breakers.

In accordance with other aspects of the disclosed concept, a method of implementing a load management scheme comprises: receiving sensor information from a number of sensors structured to sense characteristics of a managed area; estimating occupancy of the managed area based on the sensor information; receiving metering information from a number of circuit breakers electrically connected to corresponding load circuits; and implementing the load management scheme based on the sensor information and the metering information.

In accordance with other aspects of the disclosed concept, a circuit breaker for protecting a load circuit, the circuit breaker comprises: a circuit protection unit including: separable contacts; an operating mechanism structured to trip open the separable contacts; and a trip unit structured to monitor for trip conditions in the load circuit protected by the circuit breaker and to control the operating mechanism to trip open the separable contacts in response to detecting the trip condition; and a device control unit including: a processor structured to receive temperature data from one or more temperature sensors and temperature setting data from a mobile device and to control a heating, ventilation, and air conditioning (HVAC) system based on the temperature data and temperature setting data.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
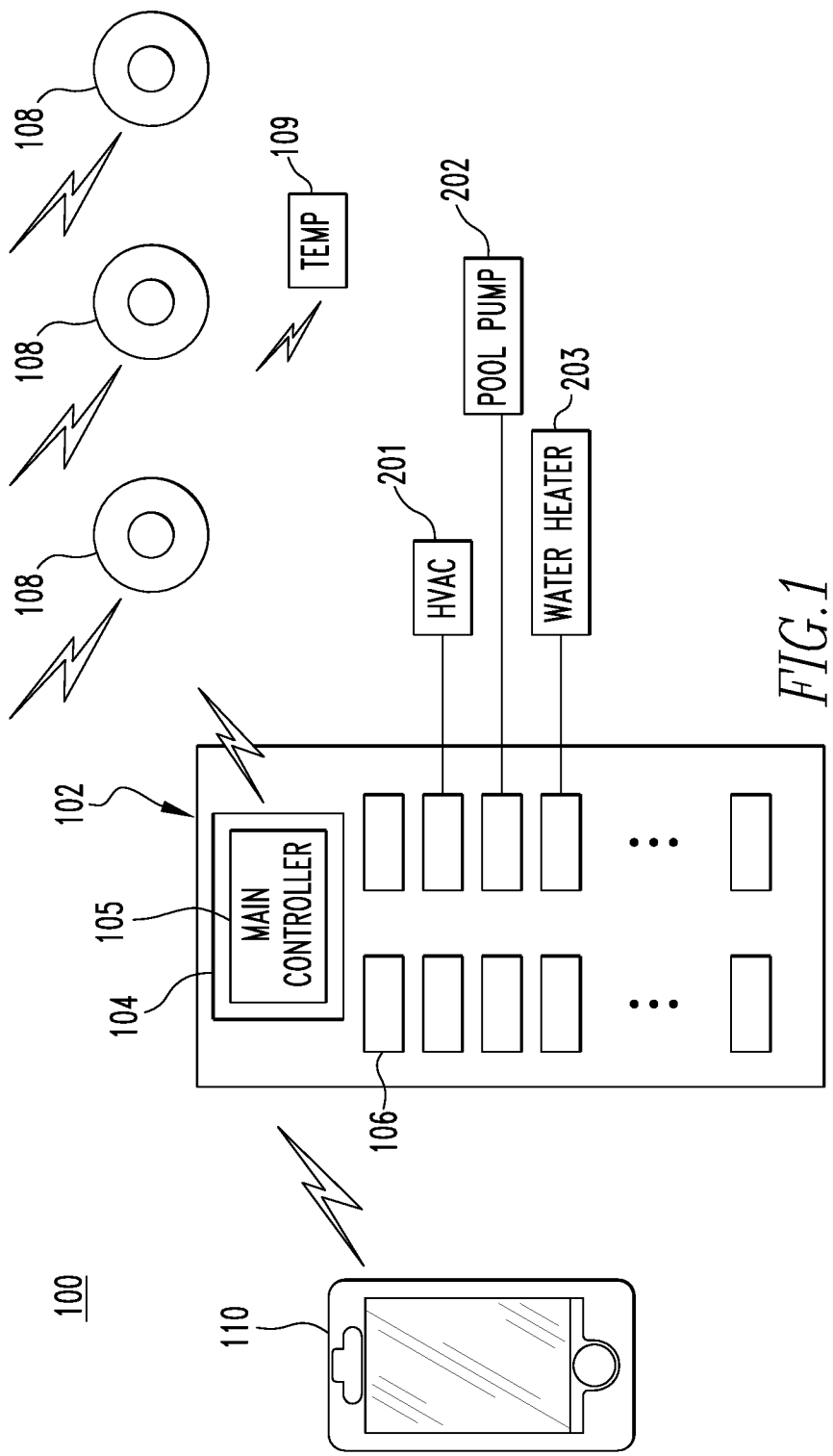
FIG. 1 is a schematic diagram of a load management system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

FIG. 1 is a schematic diagram of a load management system 100 in accordance with an example embodiment of the disclosed concept. The load management system 100 includes a load center 102 including a main circuit breaker 104 and multiple branch circuit breakers 106. In some example embodiments of the disclosed concept, the main circuit breaker 104 includes a main controller 105. However, it will be appreciated by those having ordinary skill in the art that the main controller 105 may also be located outside the main circuit breaker 104 without departing from the scope of the disclosed concept.

The load management system 100 also includes one or more sensors 108,109 associated with the main controller 105 such as, without limitation, motion sensors 108, temperature sensors 109, a mobile phone 110, or any other suitable type of sensor. A mobile phone 110 may provide various sensing capabilities such as, without limitation, location sensing, motion sensing, light sensing, sound sensing, etc. and therefore, although the mobile phone 110 may provide numerous other capabilities, it may also be considered a sensor. Moreover, any other suitable devices that provide sensing capabilities may also be employed as sensors in the load management system 100 without departing from the scope of the disclosed concept.

In some example embodiments, the motion sensors 108 are arranged at various locations in or around one or more buildings serviced by the load management system 100. For example and without limitation, the motion sensors 108 may be placed in various rooms of a building so as to sense whether a room is occupied or not. Similarly, temperature sensors 109 may be placed in various rooms of a building so as to sense the temperature of various rooms of the building. Additionally, a mobile phone 110 may be carried by an individual that occupies the building so as to provide, for example, information on where the individual is located in the building or whether the individual is located in the building.

Each of the branch circuit breakers 106 is associated with a corresponding load circuit including one or more load devices 201, 202, 203. The branch circuit breakers 106 may provide circuit protection for their corresponding load circuits such as, without limitation, by detecting fault conditions (e.g., without limitation, overcurrent, arc fault, ground fault, etc.) and to trip open in response to detecting a fault condition. The branch circuit breakers 106 may also provide a metering function for their corresponding load circuits. The metering function may, for example, measure the amount of energy used by the load circuit corresponding to the branch circuit breaker 106. The branch circuit breakers 106 may further provide a control function for the load devices 201, 202, 203 on their corresponding load circuits. For example and without limitation, if an HVAC system 201 is among the load devices on the corresponding load circuit, the branch circuit breaker 106 may communicate with the HVAC system 201 to control operation the HVAC system 201 (e.g., without limitation, turn fan on, turn fan off, turn heat on, turn heat off, etc.).

The load devices 201, 202, 203 may be any type of electrical device or system that receives power from the load center 102. In some example embodiments, the load devices 201, 202, 203 include one or more of, without limitation, an HVAC system 201, a pool pump 202 and a water heater 203. However, it will be appreciated by those having ordinary skill in the art that various other types of electrical devices or systems may be employed as load devices with the load management system 100 without departing from the scope of the disclosed concept.

The main controller 105 may communicate with the associated sensors 108, 109, 110 and may receive various information from the associated sensors. For example, if one of the sensors is a temperature sensor 109 that outputs temperature information, the main controller 105 may receive the temperature information from the temperature sensor 109. Similarly, if the sensor is a motion sensor 108 that outputs motion sensing information, the main controller 105 may receive the motion sensing information from the motion sensor 108. The main controller 105 may communicate with the sensors 108, 109, 110 via a wired interface or a wireless interface. It is also contemplated that the main controller 105 may communicate with the sensors 108, 109, 110 via one or more intermediate components (e.g., without limitation, communication network equipment, routers, switches, etc.) rather than communicating directly with the sensors 108, 109, 110.

The main controller 105 may also communicate with the branch circuit breakers 106. For example and without limitation, the branch circuit breakers 106 provide metering information associated with their corresponding load circuits to the main controller 105. The main controller 105 may also provide commands or other information to the branch circuit breakers 106. For example and without limitation, the main controller 105 may provide a command or information to a branch circuit breaker 106 which causes the branch circuit breaker 106 to control its corresponding load device 201, 202, 203 in a certain manner. It is also contemplated that the main controller 105 may provide a command or information to a branch circuit breaker 106 which causes the branch circuit breaker 106 to stop providing power to its corresponding load circuit.

The main controller 105 may also gather information from the sensors 108, 109, 110 and/or other information sources. The other information sources may include, for example and without limitation, information obtained from the internet or another network such as, without limitation, weather forecasts, utility pricing information, etc. The main controller 105 may use the metering information from the branch circuit breakers 106 and the gathered information from the sensors 108, 109, 110 and/or other information sources to develop a load management scheme (e.g., without limitation, when to turn on/turn off a load device, how to control a load device, etc.) for the load devices serviced by the load center 102 and to implement the load management scheme. For example and without limitation, in some example embodiments, the load center 102 may service a building. Developing the load management scheme may including using the gathered information to estimate the occupancy of the building or certain areas of the building. Developing the load management scheme may also learn to predict times when the building or certain areas of the building will be occupied or unoccupied based on gathered information, etc.

In some example embodiments of the disclosed concept, the metering information and utility pricing information may be used in developing a load management scheme, which can reduce cost. For example and without limitation, utility pricing information may fluctuate and the load management scheme may shift loads so that power usage is lower during times when the electricity prices are relatively high. The metering information may also be used to develop models of the behavior of loads electrically connected to the load circuits and to develop a load management scheme that optimizes the loads based on their modeled behavior.

Figure 2:
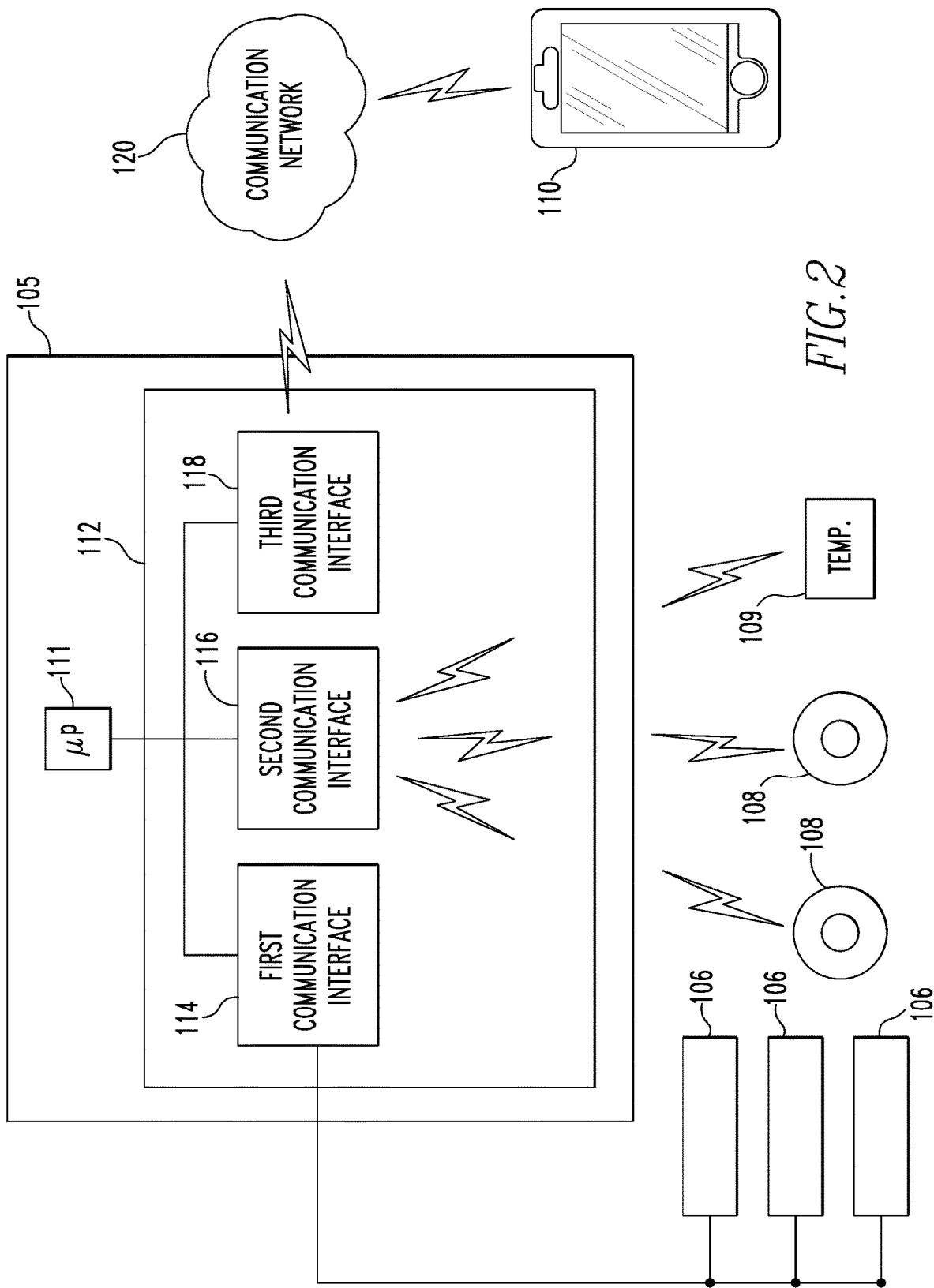
FIG. 2 is a schematic diagram of a main controller in accordance with an example embodiment of the disclosed concept.

FIG. 2 is a schematic diagram showing the main controller 105 in accordance with an example embodiment of the disclosed concept in more detail. The main controller 105 may include, for example and without limitation, a processing unit 111 and a communication interface 112. The processing unit 111 may include a processor and an associated memory. The processor may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It will also be appreciated that the memory may be included in the processor.

The communication interface 112 may be structured to communicate with various devices such as the branch circuit breakers 106 and various types of sensors such as the sensors 108, 109, 110 shown in FIG. 1. In some embodiments, the communication interface 112 may be structured to communicate using various types of communication protocols. Some examples of types of communications protocols that the communication interface 112 may support include Zigbee, Bluetooth, Wi-Fi, etc. The communication interface 112 may also support both wired communication and wireless communication. For example, in some embodiments, the communication interface 112 may use wired communication to communicate with the branch circuit breakers 106 and may use wireless communication to communication with the sensors 108, 109, 110. In some embodiments, the communication interface 112 may communication with the branch circuit breakers 106 and sensors 108, 109, 110 via various intermediary devices such as switches, routers, various network equipment, a communications network 120 (e.g., cell phone network, Internet, etc.), or any other types of intermediary device.

The communication interface 112 may include multiple communication interfaces such as a first communication interface 114, a second communication interface 116, and a third communication interface 118. In some embodiments, the first, second, and third communication interfaces 114, 116, 118 each support a different type of communication protocol. For example, the first communication interface 114 may support a wired communication protocol with the branch circuit breakers 106, the second communication interface 116 may support a wireless communication protocol with one or more types of sensors 108, 109, and the third communication interface 118 may support another type of wireless communication protocol with another type of sensor 109. Although three communication interfaces 114, 116, 118 are shown in FIG. 2, it will be appreciated that the communication interface 112 may include any number of communication interfaces. It will also be appreciated that the first, second, and third communication interfaces 114,116, 118 may each support one or more types of communication protocols. For example, the first communication interface 114 may support multiple types of wired communication protocols.

The processing unit 111 may be in communication with the communication interface 112 and may control the communication interface 112 to communicate with the branch circuit breakers 106 and sensors 108, 109, 110. For example, the processing unit 111 may control the communication interface 112 to query the sensors 108, 109, 110 for sensor information. In response, the sensors 108, 109, 110 may send sensor information (e.g., temperature information, motion information, etc.) to the communication interface 112, and the communication interface 112 may send the sensor information to the processing unit 111. The sensor information may then be stored in the processing unit 111. The processing unit 111 may similarly control the communication interface 112 to query the branch circuit breakers 106 for metering information for the load circuits associated with the branch circuit breakers 106. The processing unit 111 may also control the branch circuit breakers 106 by, for example, controlling the communication interface 112 to send commands to the branch circuit breakers 106. The processing unit 111 may also control the communication interface 112 to send information to the branch circuit breakers 106. Various types of information may be exchanged between the sensors 108, 109, 110 or branch circuit breakers 106 and the processing unit 111 via the communication interface 112.

As previously discussed, the main controller 105 may develop a load management scheme using the sensor information and the metering information. The sensor information and the metering information may be stored in the processing unit 111. The processing unit 111 may analyze the sensor information in order to determine various characteristics about the areas monitored by the sensors 108, 109, 110. For example, motion sensors may be placed at various locations in a building and the processing unit 111 may analyze sensor information from the motion sensors to determine whether the building is occupied or whether a certain area of the building is occupied. Similarly, temperature sensors may be placed at various locations in the building and the processing unit 111 may analyze sensor information from the temperature sensors to determine the temperature in various areas of the building.

In addition to the sensor information, the processing unit 111 may use metering information from the branch circuit breakers 106 to develop the load management scheme. For example, the metering information may include the actual amount of power used by load devices such as the HVAC system 201. Based on the metering information, the processing unit 111 may identify characteristics of the behavior of the load devices that can help the processing unit 111 to develop an optimal load management scheme. For example, based on the metering information, the processing unit 111 may determine that the particular HVAC system 201 in the building operates more efficiently when the temperature is maintained at 10° below the normal temperature setting when the building is not occupied than if the temperature is allowed to drop more than 10° below the normal temperature setting when the building is not occupied. That is, the HVAC system 201 may use more power to raise the temperature quickly than to maintain the temperature at a lower level for a period of time. Different types of load devices and even different types of HVAC systems may exhibit different types of behaviors. For example, one type of HVAC system may use less power by allowing the temperature to drop a large amount and then quickly raising the temperature while another type of HVAC system may operate more efficiently by maintaining the temperature close to the normal temperature setting when the building in not occupied. The processing unit 111 may, over time, learn the behavior of the load devices in order to identify ways in which the load devices may be optimally operated. The load management scheme may then incorporate the load behavior information to control the load devices in an optimal manner.

Without the metering information, the actual power usage of the load devices would only be speculated. While a load management scheme may be developed based on the occupancy of the building alone, the load management scheme may not take advantage of particular power usage characteristics of the load devices. As mentioned in the example above, the most efficient operation of one type of HVAC system may not be the same for another type of HVAC system. Thus, when only occupancy of the building the is taken into account in the load management scheme, the load management scheme lacks relevant information that could be used to further optimize it.

In addition to sensor information and metering information, the processing unit 111 may use additional information in developing the load management scheme. For example, in some embodiments, the processing unit 111 may use utility pricing information to develop the load management scheme. For example, the price of electricity may be different at different times of the day. The processing unit 111 may, for example, determine that it is less costly to use the HVAC system 201 to raise the temperature of the building during non-peak usage times. In some embodiments, additional information such as weather forecasts may also be used by the processing unit 111 to develop the load management scheme. The additional information may be obtained by the branch circuit breakers 106 or the main controller 105. For example, the branch circuit breakers 106 or the main controller 105 may communicate with the utility to obtain utility pricing information. The branch circuit breakers 106 or the main controller 105 may also communicate with other data sources, such as an Internet based data source, to obtain information such as weather forecasts or other types of information that may be useful in developing the load management scheme.

User inputs or preferences may also be considered in developing the load management scheme. For example, a user may provide various settings or preferences that may be stored in the processing unit 111. Some examples of settings or preferences may be a normal temperature setting when the building is occupied and a minimum or maximum temperature setting for when the building is not occupied. Additionally, temperature settings may be associated with different times of the day such as weekday temperature settings, night temperature settings, and weekend temperature settings. The various settings and preferences may be set by the user, for example, through an application on a mobile device or other electronic device. The main controller 105 may communicate with the mobile device 109 to receive the user's settings and preferences. The main controller 105 may also communicate with the mobile device 109 to provide it with information such as, without limitation, the status of the load devices, metering information, or other information.

Figure 3:
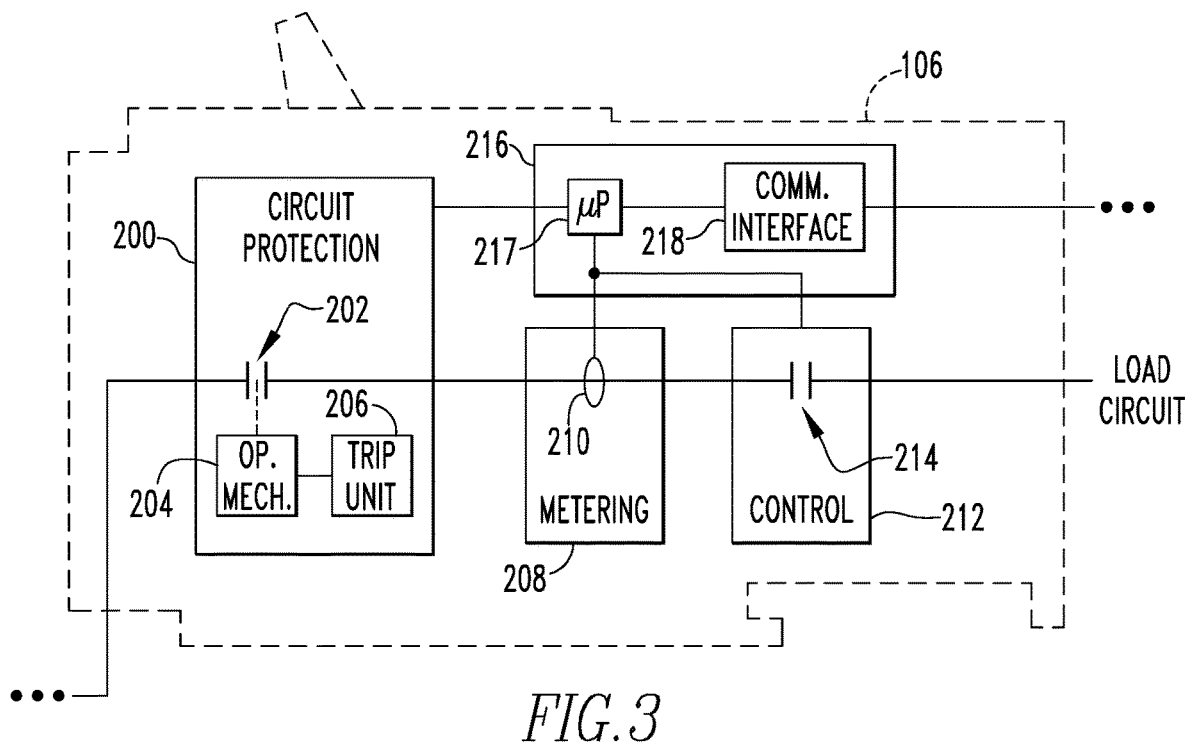
FIG. 3 is a schematic diagram of a circuit breaker in accordance with an example embodiment of the disclosed concept.

FIG. 3 is a schematic diagram of one of the branch circuit breakers 106 in accordance with an example embodiment of the disclosed concept. The branch circuit breaker 106 includes a circuit protection unit 200 that can provide a circuit protection function for the load circuit the branch circuit breaker 106 is connected to. The circuit protection unit 200 includes separable contacts 202, an operating mechanism 204, and a trip unit 206. The separable contacts 202 are disposed on a conductive path between a power source (not shown) and the load circuit. Opening the separable contacts 202 (e.g., without limitation, tripping open the separable contacts 202) electrically disconnects the load circuit from the power source. The operating mechanism 204 is structured to open and close the separable contacts 202 and may be, for example, a mechanism that can quickly open the separable contacts 202. The trip unit 206 is structured to monitor for trip conditions in the circuit protected by the branch circuit breaker 106 such as, for example and without limitation, an overcurrent fault, an arc fault, a ground fault, etc. The trip unit 206 is also structured to control the operating mechanism 204 to open the separable contacts 202. For example and without limitation, the trip unit 206 may control the operating mechanism 204 to open the separable contacts 202 in response to detecting a fault condition.

The branch circuit breaker 106 also includes a metering unit 208. The metering unit 208 is structured to meter power flowing through the load circuit connected to the branch circuit breaker 106. In some example embodiments, the metering unit 208 includes a current sensor 210 such as, without limitation, a current transformer, that is structured to sense current flowing to the load circuit. The metering unit 208 may also include other sensors such as, without limitation, a voltage sensor (not shown). In some example embodiments, the metering unit 208 may output the metering information (e.g., the amount of power used by the load circuit) to a processing unit 217 included in the branch circuit breaker 106. Also, in some example embodiments, the metering unit 208 may output the amount of current and/or voltage sensed by the metering unit 200 to the processing unit 217 and the processing unit 217 may use the information to determine the amount of power used by the load circuit.

In some example embodiments, the branch circuit breaker 106 further includes a control unit 212. The control unit 212 includes secondary separable contacts 214. Opening the secondary separable contacts 214, like opening the separable contacts 202, electrically disconnects the load circuit from the power source. However, rather than being opened in response to a trip condition, the secondary separable contacts 214 may be controlled to open or close by, for example, the processing unit 217. For example, the load management scheme may call for providing power to or cutting power off for a load device on the load circuit and the processing unit 217 may control the secondary separable contacts 214 to open and close in order to facilitate providing power to or cutting power off from the load device. In some example embodiments, the control unit 212 may include a secondary operating mechanism (not shown) structured to open and close the secondary separable contacts 214. In some example embodiments, the secondary operating mechanism may be a solenoid.

As previously described, the branch circuit breaker 106 includes the processing unit 217. The processing unit 217 may include a processor and an associated memory. The processor may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It will also be appreciated that the memory may be included in the processor. In some example embodiments, the processing unit 217 may store and execute routines to communicate with and/or control the various components of the branch circuit breaker 106 such as the circuit protection unit 200, the metering unit 208, the control unit 214, and a communication interface 218.

The branch circuit breaker 106 also includes the communication interface 218. The communication interface 218 may be structured to communicate with various devices such as the main controller 105 and one or more of the load devices 201, 202, 203. In some embodiments, the communication interface 218 may also be structured to communicate with one or more of the sensors 108, 109, 110. In some embodiments, the communication interface 218 may be structured to communicate using various types of communication protocols. Some examples of types of communications protocols that the communication interface 218 may support include Zigbee, Bluetooth, Wi-Fi, etc. The communication interface 218 may also support both wired communication and wireless communication. For example, in some embodiments, the communication interface 218 may use wired communication to communicate with the main controller 105 and may use wireless communication to communication with one or more of the load devices 201, 202, 203. In some embodiments, the communication interface 218 may communicate with the main controller 105 and load devices 201, 202, 203 via various intermediary devices such as switches, routers, various network equipment, a communications network (e.g., cell phone network, Internet, etc.), or any other types of intermediary device.

Figure 4:
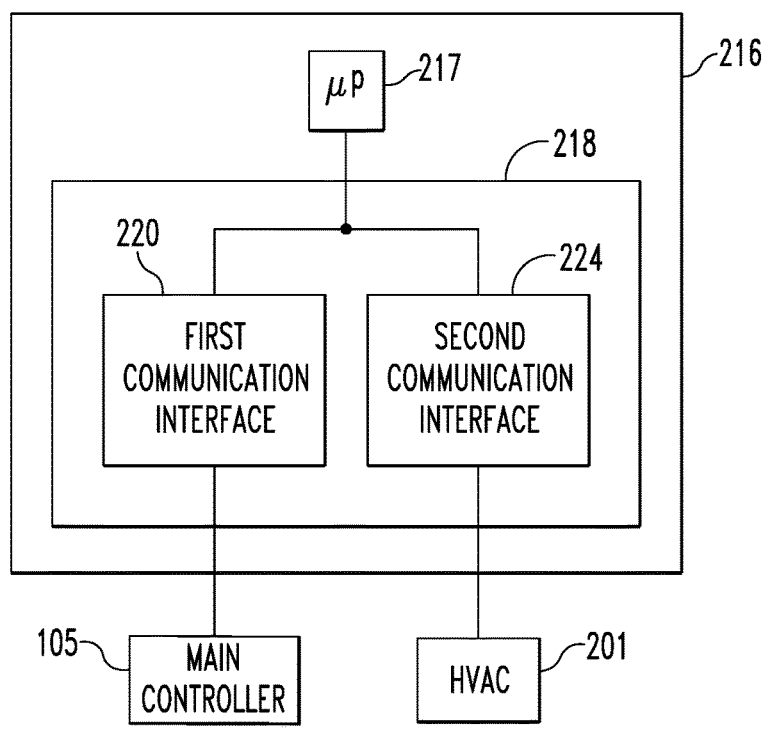
FIG. 4 is a schematic diagram of a device control unit in accordance with an example embodiment of the disclosed concept.

The communication interface 218 may include multiple communication interfaces such as a first communication interface 220 and a second communication interface 224, as is shown, for example, in FIG. 4. In some embodiments, the first and second communication interfaces 220, 224 each support a different type of communication protocol. For example, the first communication interface 220 may support a wired communication protocol with the main controller 105 and the second communication interface 224 may support a wireless communication protocol with one of the load devices 201, 202, 203 such as, for example, the HVAC system 201. Although two communication interfaces 220, 224 are shown in FIG. 4, it will be appreciated that the communication interface 218 may include any number of communication interfaces. It will also be appreciated that the first and second communication interfaces 220, 224 may each support one or more types of communication protocols. For example, the first communication interface 220 may support multiple types of wired communication protocols.

Together, the processing unit 217 and the communication unit 218 may be referred to as a device control unit 216. The device control unit 216 is able to control one or more of the load devices 201, 202, 203. The device control unit 216 may control load devices 201, 202, 203 directly by communicating with the load devices 201, 202, 203 to control their operation. The device control unit 216 may also control load devices 201, 202, 203 by, for example, controlling the branch circuit breaker 106 to open its separable contacts 214 and stop providing power to the load devices 201, 202, 203. Any other functions of the processing unit 217 and/or communication interface 218 described herein may be considered to be a function of the device control unit 216. The device control unit 216 may control the load devices 201, 202, 203 based on the load management scheme developed by the processing unit 111 of the main controller 105.

Referring back to FIG. 3, the communication interface 218 is connected to and in communication with the processing unit 217. The processing unit 217 may generate instructions and/or information and control the communication interface 218 to send the instructions and/or information to various devices such as the main controller 105 and/or the load devices 201, 202, 203. Additionally, information and/or instructions received by the communication interface 218 may be provided to the processing unit 217. The processing unit 217 may also interpret instructions and/or information received from the communication interface 218 and use the instructions and/or information to control various components of the branch circuit breaker 106. For example and without limitation, the processing unit 216 may control the control unit 212 to open the secondary contacts 214 in response to instructions received from the main controller 105.

Figure 5:
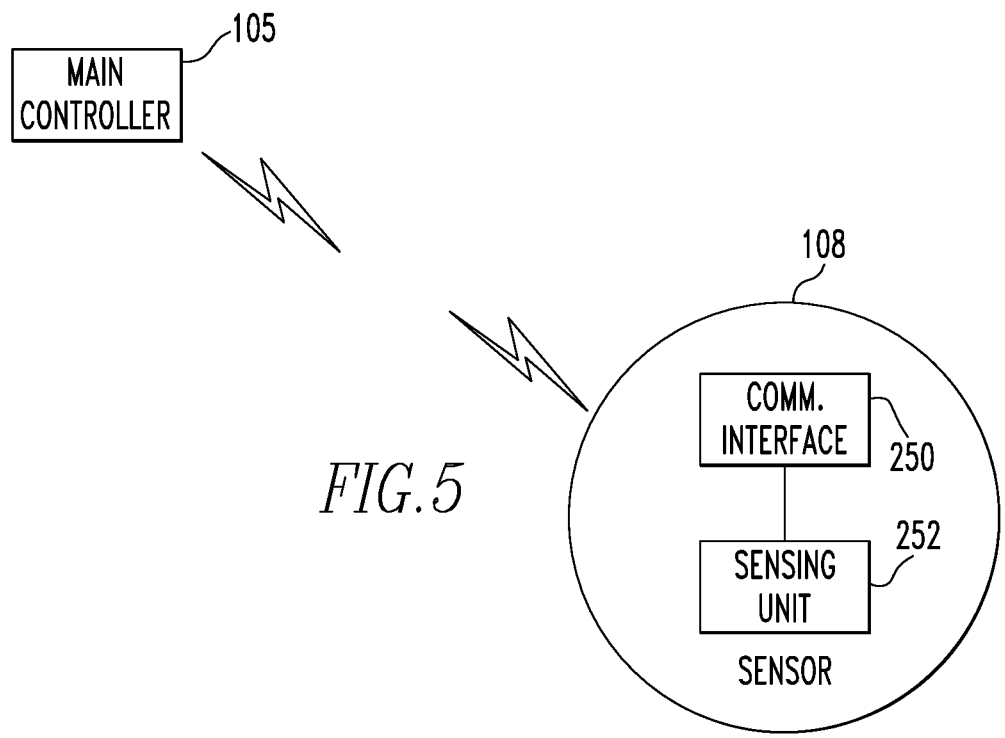
FIG. 5 is a schematic diagram of a senor in accordance with an example embodiment of the disclosed concept.

Referring to FIG. 5, a schematic diagram of a sensor 108 in accordance with an example embodiment of the disclosed concept is shown. The sensor 108 includes a communication interface 250 and a sensing unit 252. In some example embodiments, the sensing unit 252 provides the components and circuitry for providing the sensing capability of the sensor 108. For example and without limitation, if the sensor 108 is a motion sensor, the sensing unit 252 may include a motion sensor element and its associated circuitry to provide a motion sensing capability. Similarly, if the sensor 108 is a temperature sensor, the sensing unit 252 may include a temperature sensor element and its associated circuitry to provide a temperature sensing capability. It will also be appreciated that other types of sensors may be employed as the sensor 108 without departing from the scope of the disclosed concept.

The communication interface 250 of the sensor 108 may be structured to communicate with various devices such as the main controller 105 and/or one or more of the branch circuit breakers 106. In some embodiments, the communication interface 250 may be structured to communicate using various types of communication protocols. Some examples of types of communications protocols that the communication interface 250 may support include Zigbee, Bluetooth, Wi-Fi, etc. The communication interface 250 may also support wired communication, wireless communication, or both. For example, in some embodiments, the communication interface 250 may use wired communication to communicate with the main controller 105 and, in some embodiments, the communication interface 250 may use wireless communication to communication with the main controller 105. In some embodiments, the communication interface 250 may communicate with the main controller 105 via various intermediary devices such as switches, routers, various network equipment, a communications network (e.g., cell phone network, Internet, etc.), or any other types of intermediary device.

Figure 6:
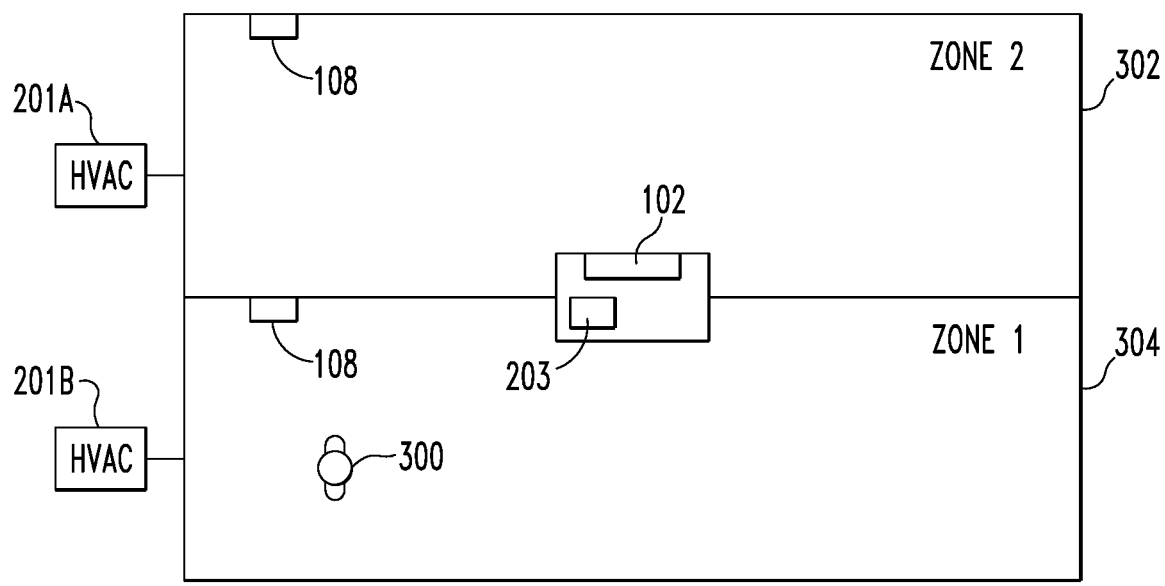
FIG. 6 is a diagram of a managed area in accordance with an example embodiment of the disclosed concept.

FIG. 6 is a diagram of an example embodiment of an implementation of the load center 102 in a managed area such as a residence or other building. The example managed area has two zones, Zone 1 and Zone 2. Each zone has a corresponding motion sensor 108. Each zone also has a corresponding HVAC unit 201A, 201B. For example, the managed area may have dual zone climate control. In the example shown in FIG. 6, a person is located in Zone 1. The motion sensor 108 corresponding to Zone 1 will sense the motion caused by the person 300 and will communicate its output to the load center 102. The motion sensor 108 corresponding to Zone 2 will not sense any movement in Zone 2 and will communicate this output to the load center 102. Based on the outputs of the motion sensors 108, the load center 102 may estimate that Zone 1 is occupied and that Zone 2 is not occupied.

Based on the occupancy determination, the load center 102 may implement a load management scheme. For example and without limitation, the load center 102 may activate only the HVAC unit 201A corresponding to Zone 1. The load center 102 may also meter the power usage of the HVAC unit 201A and model its behavior over time. Based on the modeled behavior, the load center 102 may adapt the load management scheme to optimally operation the HVAC unit 201A or other load devices. As previously described, additional types of information may also be taken into account when implementing the load management scheme such as, without limitation, weather forecasts, utility pricing information, use preferences and settings, etc.

The managed area may also include a water heater 203. The water heater 203 may not correspond to a particular zone. In some example embodiments of the disclosed concept, the implemented load management scheme may control the water heater to heat its water to a predetermined temperature when it estimates that the managed area is occupied. The load management scheme may also be adapted over time using historical data regarding when the managed area is occupied to predict when the managed area will be occupied and activate the HVAC units 201A, 201B, the water heater 203, or other load devices in anticipation of the managed area becoming occupied.

Figure 7:
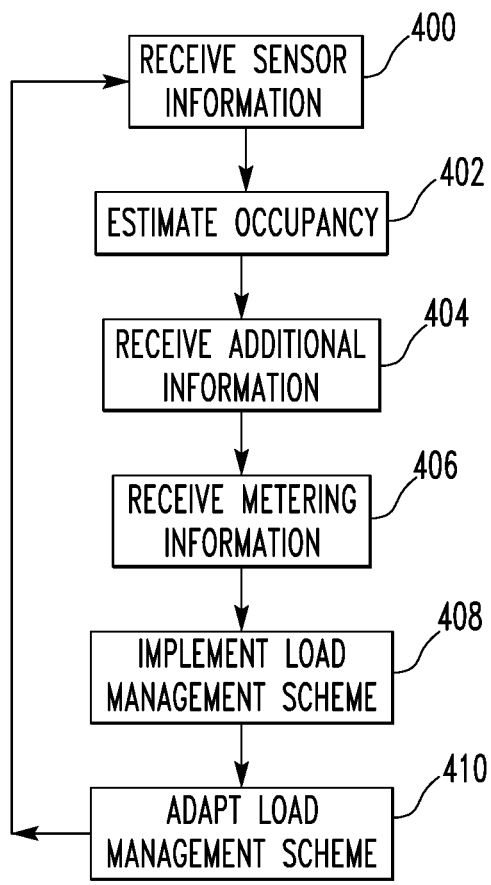
FIG. 7 is a flowchart of a method of implementing a load management scheme in accordance with an example embodiment of the disclosed concept.

FIG. 7 is a flow chart of a method of implementing a load management scheme in accordance with an example embodiment of the disclosed concept. The method may be implemented by, for example, the load management system 100 shown in FIG. 1. At 400, the main controller 105 receives information from one or more of the sensors 108, 109, 110 corresponding to a managed area. Then, at 402, the main controller 105 estimates occupancy of the managed area based on the outputs of the sensors 108, 109, 110. At 404, the main controller 105 receives additional information such as, without limitation, weather forecasts, utility pricing information, user preferences or settings, or other information. At 406, the main controller 105 receives metering information from one or more of the branch circuit breakers 106.

At 408, the main controller 105 implements a load management scheme. The load management scheme may be based on the estimated occupancy, the additional information, and/or the metering information. At 410, the main controller 105 may adapt the load management scheme. The load management scheme may be adapted based on one or more of the estimated occupancy, the additional information, and the metering information. Through the adaptation, over time, the main controller 105 may learn the behavior of the loads affected by the load management scheme, the occupancy of the managed area, utility pricing information, or other information and may use such information to optimize the load management scheme to reduce energy usage while maintaining thermal comfort and preferred water temperature for occupants of the managed area. The method may return to 400 and continually repeat. It will be appreciated by those having ordinary skill in the art that the steps shown in FIG. 7 do not need to be performed in the specific order as shown. The order of the steps may be changed and some steps may be performed simultaneously without departing from the scope of the disclosed concept.

Figure 8:
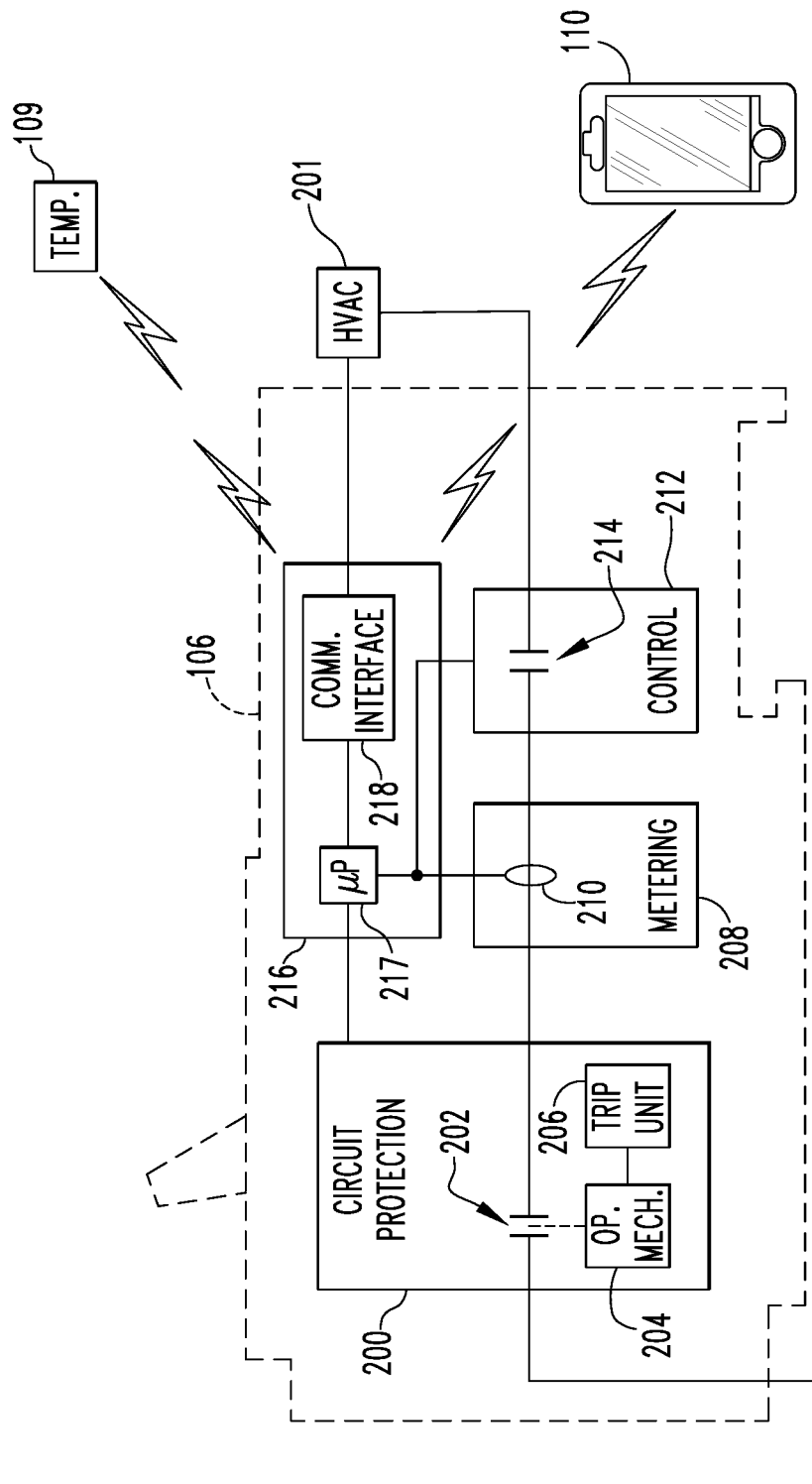
FIG. 8 is a schematic diagram of a circuit breaker in accordance with another example embodiment of the disclosed concept.

FIG. 8 is a schematic diagram of a circuit breaker 106 applied to control an HVAC system 201 in accordance with an example embodiment of the disclosed concept. The circuit breaker 106 is similar to the circuit breaker 106 previously described with respect to FIG. 3. In the present embodiment, the communication interface 218 of the circuit breaker 106 is structured to communicate with one or more temperature sensors 109 using, for example and without limitation, wireless communication. The communication interface 218 is also structured to communicate with components of the HVAC system 201. The communication interface 218 may further communicate with a mobile device such as a mobile phone 110.

In the present embodiment, the processor 217 is structured to send and/or receive information to and/or from the temperature sensors 109, HVAC system 201, and the mobile phone 110 via the communication interface 218. For example and without limitation, a user may enter temperature setting data into an application in the mobile phone 110. The temperature setting data may include, for example and without limitation, a target temperature and/or a schedule of target temperatures associated with different days and/or times of day. The temperature setting data may be provided to the processor 217 via the communication interface 218. The temperature sensors 109 are structured to sense temperature and to provide temperature data to the processor 217 via the communication interface 218.

The processor 217 is structured to output control commands to the HVAC system 201 via the communication interface 218. The control commands may control the HVAC system 201 or its various components. For example and without limitation, the control commands may control the HVAC system 201 to turn on heat, turn off heat, turn on cooling, turn off cooling etc. It will be appreciated by those having ordinary skill in the art that the control commands may include commands that are the same or similar as commands that are provided from a thermostat to an HVAC system. It will also be appreciated by those having ordinary skill in the art that the communication interface 218 may provide an interface between the circuit breaker 106 and the HVAC system 201 that is the same or similar to the interface between a thermostat and an HVAC system. It will further be appreciated by those having ordinary skill in the art that the circuit breaker 106 and temperature sensors 109 may replace the functionality of a thermostat so that in residences where the circuit breaker 106 and temperature sensors 109 are installed, a conventional thermostat would not be needed.

The processor 217 is structured to control the HVAC system 201 based on the temperature data and the temperature setting data. For example, if the temperature data indicates that the temperature is above a level indicated in the temperature setting data, the processor 217 may determine that cooling may be turned on, or that heat may be turned off until the target temperature is reached. The processor 217 may also use more complex schemes to control the HVAC system 201. For example and without limitation, the processor 217 may preemptively turn on the heat so that the temperature reaches the target level at a predetermined time.

In some example embodiments of the disclosed concept, the circuit breaker 106 in the present embodiment may be used in conjunction with the load center 102 of FIG. 1. For example and without limitation, the circuit breaker 106 may provide a thermostat functionality and control the HVAC system 201. The circuit breaker 106 may also receive information of the load management scheme developed in the main controller 105 and use the information in controlling the HVAC system 201. For example and without limitation, the load management scheme may determine that the HVAC system 201 should be operated to reach a target temperature during time historically associated with occupancy of the residence and should be turned off for other periods of time. The circuit breaker 106 may control the HVAC system 201 using such information to achieve the target temperatures.

In addition to replacing the functionality of a thermostat, the circuit breaker 106 also provides a circuit protection function via the circuit protection unit 200. In some example embodiments of the disclosed concept, the circuit breaker 106 also provides a metering functionality via the metering unit 208. As previously described, the circuit breaker 106 may be installed in the load center 102.

Figure 9:
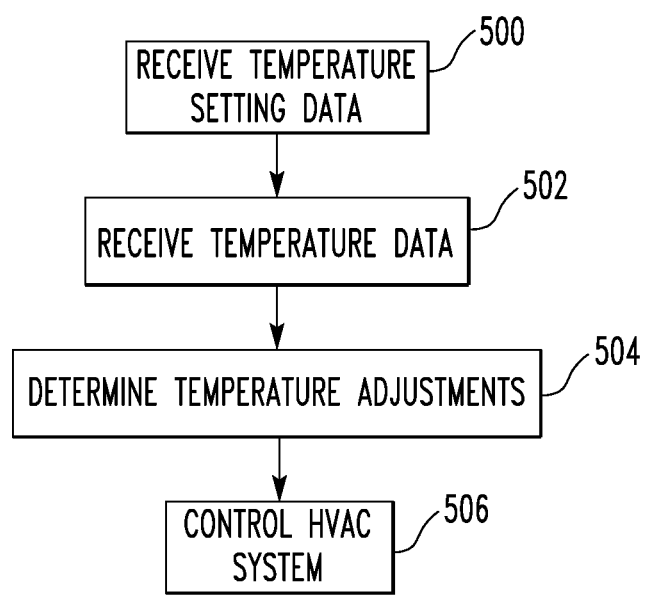
FIG. 9 is a flowchart of a method of controlling an HVAC system in accordance with an example embodiment of the disclosed concept.

FIG. 9 is a flowchart of a method of controlling an HVAC system in accordance with an example embodiment of the disclosed concept. The method of FIG. 9 may be implemented by, for example and without limitation, the circuit breaker 106 of FIG. 3 and, for example and without limitation, may be implemented, at least in part, as a routine executed by the processor 217.

The method begins at 500 where the processor 217 receives temperature setting data. The temperature setting data may be received from the mobile phone 110. In some example embodiments of the disclosed concept, the temperature setting data may be received from the main controller 105. At 502, the processor 217 receives temperature data from the temperature sensors 109. Then, at 504, the processor 217 determines what temperature adjustments are needed. For example, the processor 217 may determine what adjustments are needed based on the temperature setting data and the temperature data. At 506, the processor 217 controls the HVAC system 201 based on what adjustments were determined to be needed.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A load management system comprising:
a number of sensors structured to sense characteristics of a managed area;
a controller including a processor structured to estimate occupancy of the managed area based on outputs of the number of sensors and to implement a load management scheme; and
a number of circuit breakers, at least one of the number of circuit breakers being electrically connected to a corresponding load circuit and including a metering circuit structured to meter energy provided to the load circuit;
wherein the processor is structured to implement the load management scheme based on outputs of the sensors and metering information of one or more of the circuit breakers,
wherein the processor is structured to adapt the load management scheme based on the metering information to optimize operation of one or more load devices powered by the load circuit to improve energy efficiency of the one or more load devices while powered by the load circuit,
wherein the at least one of the number of circuit breakers includes:
separable contacts;
an operating mechanism structured to trip open the separable contacts;
a trip unit structured to monitor for a trip condition in the load circuit protected by the at least one of the number of circuit breakers and to control the operating mechanism to trip open the separable contacts in response to detecting the trip condition; and
secondary separable contacts,
wherein the at least one of the number of circuit breakers includes a device control unit structured to communicate directly with the one or more load devices to control operation of the one or more load devices, and wherein the at least one of the number of circuit breakers is structured to control operation of the one or more load devices in response to communications from the controller to implement the load management scheme and optimize operation of the one or more load devices to improve energy efficiency of the one or more load devices while powered by the load circuit, and
wherein the processor is structured to learn behavior characteristics of the one or more load devices based on the metering information and to adapt the load management scheme based on the learned behavior characteristics to optimize operation of the one or more load devices to improve energy efficiency.

2. The load management system of claim 1, wherein the one or more loads includes at least one of a water heater, a pool pump, and an heating, ventilation, and air conditioning (HVAC) system.

3. The load management system of claim 1, wherein the processor is structured to develop the load management scheme using additional information; and wherein the additional information includes at least one of utility pricing information and weather forecast information.

4. The load management system of claim 1, wherein the controller is structured to communicate with a mobile device and to receive user setting information from the mobile device; and wherein the controller is structured to implement the load management scheme based on the user setting information.

5. The load management system of claim 1, wherein the number of sensors include at least one of a motion sensor, a light sensor, and a temperature sensor.

6. The load management system of claim 1, wherein the controller includes a first communication interface structured to communicate with the number of circuit breakers, a second communication interface structured to communicate with the number of sensors, and a third communication interface structured to communicate with a mobile device.

7. The load management system of claim 6, wherein the first communication interface is structured to provide wired communication and the second communication interface is structured to provide wireless communication.

8. A method of implementing a load management scheme, the method comprising:
 receiving sensor information, with a controller including a processor, from a number of sensors structured to sense characteristics of a managed area;
 estimating occupancy, with the controller including the processor, of the managed area based on the sensor information;
 receiving metering information, with the controller including the processor, from a number of circuit breakers electrically connected to corresponding load circuits; and
 implementing the load management scheme, with the controller including the processor, based on the sensor information and the metering information;
 adapting the load management scheme, with the controller including the processor, based on the metering information to optimize operation of one or more load devices powered by one of the load circuits to improve energy efficiency of the one or more load devices while powered by the one of the load circuits,
 wherein at least one of the number of circuit breakers is electrically connected to the corresponding load circuit and includes a metering circuit structured to meter energy provided to the load circuit,
 wherein the at least one of the number of circuit breakers includes:
  separable contacts;
  an operating mechanism structured to monitor for a trip condition in the load circuit protected by the at least one of the number of circuit breakers and to control the operating mechanism to trip open the separable contacts in response to detecting the trip condition; and
  secondary separable contacts,
 wherein the at least one of the number of circuit breakers includes a device control unit structured to communicate directly with the one or more load devices to control operation of the one or more load devices, and wherein the at least one of the number of circuit breakers is structured to control operation of the one or more load devices in response to communications from the controller to implement the load management scheme and optimize operation of the one or more load devices while powered by the load circuit, and
 wherein the controller including the processor is structured to learn behavior characteristics of the one or more load devices based on the metering information and to adapt the load management scheme based on the learned behavior characteristics to optimize operation of the one or more load devices to improve energy efficiency.

9. The method of claim 8, wherein the one or more loads includes at least one of a water heater, a pool pump, and an heating, ventilation, and air conditioning (HVAC) system.

10. The method of claim 8, further comprising:
 adapting the load management scheme based on one or more of the sensor information and metering information.

11. The method of claim 8, further comprising:
 receiving additional information including at least one of utility pricing information and weather forecast information,
 wherein implementing the load management scheme includes implementing the load management scheme based on the additional information.

12. The method of claim 8, further comprising:
 communicating with a mobile device;
 receiving user setting information from the mobile device; and
 implementing the load management scheme based on the user setting information.

13. The method of claim 8, wherein the number of sensors include at least one of a motion sensor, a light sensor, and a temperature sensor.

14. The method of claim 8, wherein the controller includes a first communication interface structured to communicate with the number of circuit breakers, a second communication interface structured to communicate with the number of sensors, and a third communication interface structured to communicate with a mobile device.

15. The method of claim 14, wherein the first communication interface is structured to provide wired communication and the second communication interface is structured to provide wireless communication.

16. A load management system comprising:
 a controller including a processor structured to receive outputs of a number of sensors, to estimate occupancy of a managed area based on the outputs of one or more of the number of sensors, to receive utility pricing information and weather forecast information, and to develop a load management scheme; and
 a circuit breaker being electrically connected to a corresponding load circuit having one or more load devices, the circuit breaker including:
  a metering circuit structured to meter energy provided to the load circuit;
  a circuit protection unit including separable contacts, an operating mechanism structured to trip open the separable contacts, and a trip unit structured to monitor for a trip condition in the load circuit protected by the at least one of the number of circuit breakers and to control the operating mechanism to trip open the separable contacts in response to detecting the trip condition;
  secondary separable contacts; and
  a device control unit structured to output metering information corresponding to the metered energy to the controller, to receive communications from the controller, and to communicate directly with the one or more load devices to control operation of the one or more load devices in response to communications from the controller to implement the load management scheme,
 wherein the processor is structured to develop the load management scheme based on the metering information, the estimated occupancy, the utility pricing information, and the weather forecast information, wherein the processor is structured to adapt the load management scheme based on the metering information to optimize operation of one or more load devices powered by the load circuit to improve energy efficiency of the one or more load devices while powered by the load circuit, and wherein the processor is structured to learn behavior characteristics of the one or more load devices based on the metering information and to adapt the load management scheme based on the learned behavior characteristics to optimize operation of the one or more load devices to improve energy efficiency.

17. The load management system of claim 16, wherein the processor is structured to adapt the load management scheme based on the metering information, the estimated occupancy, the utility pricing information, and the weather forecast information.

18. The load management system of claim 16, wherein the number of sensors include at least one of a motion sensor, a light sensor, and a temperature sensor.

19. The load management system of claim 16, wherein the controller is structured to receive user setting information from a mobile device and to develop the load management scheme based on the user setting information.

\* \* \* \* \*